United States Patent
Rabinowitz et al.

(10) Patent No.: US 10,181,229 B2
(45) Date of Patent: Jan. 15, 2019

(54) METHOD AND SYSTEM FOR IMPLEMENTING A UNIVERSAL KEY CARD

(71) Applicant: HYATT CORPORATION, Chicago, IL (US)

(72) Inventors: Armand Rabinowitz, Riverwoods, IL (US); Brett Cowell, Lisle, IL (US)

(73) Assignee: Hyatt Corporation, Chicago, IL (US)

( * ) Notice: Subject to any disclaimer, the term of this patent is extended or adjusted under 35 U.S.C. 154(b) by 0 days.

(21) Appl. No.: 15/266,470

(22) Filed: Sep. 15, 2016

(65) Prior Publication Data
US 2017/0084098 A1 Mar. 23, 2017

Related U.S. Application Data

(60) Provisional application No. 62/220,495, filed on Sep. 18, 2015.

(51) Int. Cl.
*G07C 9/00* (2006.01)
*G06Q 10/02* (2012.01)
*G06Q 50/12* (2012.01)

(52) U.S. Cl.
CPC ..... *G07C 9/00103* (2013.01); *G07C 9/00904* (2013.01); *G06Q 10/02* (2013.01); *G06Q 50/12* (2013.01)

(58) Field of Classification Search
CPC ................ G06Q 10/02; G07C 9/00031; G07C 9/00007; G07C 9/00; G07C 2209/02; G07C 2209/04
USPC ........................ 340/4.6, 5.8, 5.81–5.82, 5.86
See application file for complete search history.

(56) References Cited

U.S. PATENT DOCUMENTS

| | | | | | |
|---|---|---|---|---|---|
| 4,849,614 | A | * | 7/1989 | Watanabe | G06Q 20/341 235/379 |
| 5,581,630 | A | * | 12/1996 | Bonneau, Jr. | G07C 9/00079 235/380 |
| 8,190,588 | B1 | * | 5/2012 | Gupta | G06F 11/1662 707/615 |
| 2004/0093340 | A1 | * | 5/2004 | Edmondson | G06Q 10/10 |
| 2004/0250083 | A1 | * | 12/2004 | Schwab | G06Q 30/0601 713/182 |

(Continued)

OTHER PUBLICATIONS

NPX Semniconductors N.V., "MC0ICU1—MIFARE Ultralight contactless single-ticket IC," Rev. 3.9 (Jul. 23, 2014).
NPX Semniconductors N.V., "MF0ULx1—MIFARE Ultralight EV1—Contactless ticket IC," Rev. 3.1 (Jun. 30, 2014).
NPX Semniconductors N.V., "MF1PLUSx0y1—Mainstream contactless smart card IC for fast and easy solution development," Rev. 3.2 (Feb. 21, 2011).

(Continued)

*Primary Examiner* — Carlos Garcia
(74) *Attorney, Agent, or Firm* — Baker & Hostetler LLP

(57) ABSTRACT

Providing access to one or more services at a place of hospitality is described. Initially, information regarding a user is received from a medium, where the medium includes a plurality of sectors and the information regarding the user is stored on one or more dedicated sectors. An identity of the user is determined based on the information regarding the user. A service reserved for the user is identified based on the identity of the user, where the service is provided by a service provider at the place of hospitality. One or more dedicated sectors of the plurality of sectors of the medium assigned to the service provider are then identified. Finally, the one or more dedicated sectors assigned to the service provider are configured to enable access to the service reserved for the user and provided by the service provider.

20 Claims, 6 Drawing Sheets

(56) References Cited

U.S. PATENT DOCUMENTS

| | | | |
|---|---|---|---|
| 2011/0191841 A1* | 8/2011 | Corda | G06F 12/1483 |
| | | | 726/9 |
| 2012/0116880 A1* | 5/2012 | Patel | G06Q 20/108 |
| | | | 705/14.54 |
| 2015/0201103 A1* | 7/2015 | Atsumi | H04N 1/21 |
| | | | 358/1.17 |
| 2015/0347729 A1* | 12/2015 | Eberwine | G06F 21/34 |
| | | | 726/9 |
| 2016/0094943 A1* | 3/2016 | Cao | H04W 4/021 |
| | | | 455/456.1 |
| 2016/0154970 A1* | 6/2016 | Calmon | H04L 9/06 |
| | | | 713/165 |

OTHER PUBLICATIONS

NPX Semniconductors N.V., "MF1S70yyX/V1—MIFARE Classic EV1 4K—Mainstream contactless smart card IC for fast and easy solution development," Rev. 3.1 (Sep. 8, 2014).

NPX Semniconductors N.V., "MF1SEP10x1—Secure contactless smart card IC for seamless migration," Rev. 3.0 (Apr. 27, 2015).

NPX Semniconductors N.V., "MF1SPLUSx0y1—Mainstream contactless smart card IC for fast and easy solution development," Rev. 3.2 (Feb. 21, 2011).

NPX Semniconductors N.V., "SmartMX2 P40 family—P40C012/040/072—Secure smart card controller," Rev. 3.0 (Apr. 24, 2015).

\* cited by examiner

USER DEVICE 300

| SECTOR | BLOCKS | | | |
|---|---|---|---|---|
| | 0 | 1 | 2 | 3 |
| 0 | MANUFACTURER DATA 310 | APPLICATION DIRECTORY 320 | | CONFIGURATION DATA 340 |
| 1 | LOCK VENDOR DATA 350 | | | |
| 2 | | | | |
| 3 | | | | |
| 4 | | | | |
| 5 | | | | |
| 6 | LOCK VENDOR DATA 352 | | | |
| 7 | | | | |
| 8 | | | | |
| 9 | | | | |
| 10 | | | | |
| 11 | SHARED VENDOR DATA 354 | | | |
| 12 | PARKING VENDOR DATA 356 | | | |
| 13 | | | | |
| 14 | ELEVATOR VENDOR DATA 358 | | | |
| 15 | | | | |
| 16 | APPLICATION DIRECTORY 330 | | | |
| 17 | HOTEL DATA 360 | | | |
| 18 | USER DATA 362 | | AUTHENTICATION DATA 364 | |
| 19 | | | | |
| 20 | | | | |
| 21 | ADDITIONAL VENDOR(S) DATA 370 | | | |
| 22 | | | | |
| 23 | | | | |
| 24 | | | | |
| 25 | | | | |
| 26 | | | | |
| 27 | | | | |
| 28 | | | | |
| 29 | | | | |
| 30 | | | | |
| 31 | | | | |

FIG. 3

METHOD AND SYSTEM FOR IMPLEMENTING A UNIVERSAL KEY CARD

CROSS-REFERENCE TO RELATED APPLICATIONS

This application claims priority to U.S. Provisional Patent App. No. 62/220,495, filed Sep. 18, 2015, the disclosure of which is hereby incorporated by reference in its entirety.

TECHNICAL FIELD

This disclosure generally relates to an access control device, and methods and systems for implementing such a device. More particularly, this disclosure relates to a universal key card including a plurality of sectors dedicated to different service providers.

BACKGROUND

Guests staying at hospitality establishments are provided a number of services. When a guest arrives at an establishment, the guest is typically required to check-in at a front desk in order to receive an access key, such as a magnetic card, for accessing a room. The guest may also need to obtain one or more additional access keys for accessing various amenities around the establishment such as, for example, a fitness center, a spa, an elevator, or a parking structure. While a guest that is serviced immediately upon his arrival may gain access to his room and other amenities in a relatively short period of time, guests that arrive during peak check-in times may encounter significant delays and congestion. When guests receive multiple access keys, such as for their room and an onsite amenity, it may also be difficult for guests to keep track of the keys and distinguish between them. Access keys such as magnetic cards may also lose their data when placed near a mobile device such as a cell phone.

Moreover, different hospitality establishments may use different access keys. This may be the case even when the establishments are part of a single business chain. Different access keys may be required to access the rooms and amenities at the different establishments because the establishments work with different vendors. The vendors may program their locks and other devices to only respond to access cards encoded with their proprietary data structures. As such, guests travelling between the different establishments need to obtain a separate set of access keys for each establishment. This not only adds to the inconvenience of guests, but also increases the operational costs of the establishments.

When guests leave an establishment, they sometimes take the access keys with them. Guests may also lose their access keys. Over time, the cost of replacing these access keys may be substantial. In order to avoid these costs, some establishments may charge guests for the loss of their key cards. Other establishments may employ low-cost key cards that are easily replaced if lost. Both of these methods, however, have drawbacks. Requiring guests to pay for lost key cards may decrease guest satisfaction. And employing low-cost key cards that break easily may cause inconvenience to guests and staff.

Therefore, there is a need for an access control device which can work with multiple vendors and be permanently associated with a particular guest.

SUMMARY

Providing access to one or more services at a place of hospitality is described. Initially, information regarding a user is received from a medium, where the medium includes a plurality of sectors and the information regarding the user is stored on one or more dedicated sectors. An identity of the user is determined based on the information regarding the user. A service reserved for the user is identified based on the identity of the user, where the service is provided by a service provider at the place of hospitality. One or more dedicated sectors of the plurality of sectors of the medium assigned to the service provider are then identified. Finally, the one or more dedicated sectors assigned to the service provider are configured to enable access to the service reserved for the user and provided by the service provider.

In another aspect, a device for providing access to one or more services at a place of hospitality includes a processor, a storage medium, a receiver and a transmitter. The storage medium includes a plurality of sectors including a first dedicated set of sectors configured to store information regarding a user, a second dedicated set of sectors configured to store information associated with a first service provider, and a third dedicated set of sectors configured to store information associated with a second service provider that is different from the first service provider. The receiver is configured to receive a first instruction, where the first instruction, upon execution by the processor, causes the device to configure the second dedicated set of sectors to enable access to a service provided by the first service provider at the place of hospitality. The transmitter is configured to transmit a signal to an access device associated with the service provided by the first service provider at the place of hospitality.

In an additional aspect, a system for providing access to one or more services at a place of hospitality includes a user device, an encoding device and an access device. The user device includes a processor and a plurality of sectors. The plurality of sectors include a first dedicated set of sectors configured to store information regarding a user, a second dedicated set of sectors configured to store information associated with a first service provider, and a third dedicated set of sectors configured to store information associated with a second service provider. The encoding device is configured to receive the information regarding the user stored in first dedicated set of sectors, determine an identity of the user, and identify a service reserved for the user, where the service is provided by the first service provider. The encoding device is further configured to identify the second dedicated set of sectors assigned to the first service provider and configure the second dedicated set of sectors assigned to the first service provider to enable access to the service reserved for the user and provided by the first service provider. The access device is associated with the service at the place of hospitality and is configured to access a code stored in the second dedicated set of sectors assigned to the first service provider, where the code enables the service reserved for the user and provided by the first service provider. The access device is further configured to determine whether the code matches an expected code and enable access to the service reserved for the user in response to the determination that the code matches the expected code.

Details of one or more implementations of the disclosure are set forth in the accompanying drawings and the description below. Other aspects of the disclosure will be apparent from the description and drawings, and from the claims.

BRIEF DESCRIPTION OF THE DRAWINGS

In order that the disclosure may be readily understood, aspects of the disclosure are illustrated by way of examples in the accompanying drawings, in which like reference numerals refer to like elements throughout.

FIG. 3 illustrates an exemplary user device for providing access to services at a place of hospitality according to certain aspects of the disclosure.

DETAILED DESCRIPTION

Methods and system disclosed herein relate to a universal key card, such as a radio-frequency identification (RFID) card, that may be issued as a permanent or reusable key to a guest. The universal key card allows hotels to use a single key card to provide access to a range of services provided by different vendors. The universal key card may also enable hotels to issue a single permanent or reusable key for guests travelling between different hotel locations.

By storing data structures for one or more vendors and for a particular building, the universal key may provide a secure method for providing access to various services at the building. The universal key may be used with locks that are not connected to a network (e.g., an offline lock). A guest may use the universal key to access an authorized location by touching the key to a "hotspot" encoder located near the ingress and egress points. By allowing guests to access their rooms via a "hotspot" encoder, the universal key may enable guests to check-in to their rooms or service without visiting a front desk, saving customer time and operator money.

The universal key card may be an RFID key. The RFID key may be encoded in advance of distribution to a guest with data that identifies the guest so that the key may function without having to connect to a network (e.g., offline). During a guest's stay at the place of hospitality, the guest may tap the key to a "hotspot" encoder upon arrival, which may configure the key to provide the guest with access to controlled locations such as a guest room or other common areas at the place of hospitality. Specifically, the "hotspot" encoder may configure the key by adding or changing data specific to one or more lock vendors or other vendors that provide services at the place of hospitality (e.g., an elevator vendor, a parking vendor). The configured key may then be used to unlock doors or other entryways into the controlled locations. Access devices such as electronic locks may be located at the doors and entryways into the controlled locations. These devices may be individually programmed to recognize certain data that is stored on the configured keys and provide access the controlled rooms to the guest.

The universal key card may include a plurality of data sectors, each with a number of assigned blocks. Certain data sectors are dedicated to store data pertaining to place of hospitality, including information regarding a guest, Other data sectors are dedicated to store data for different vendors.

Figure 1:
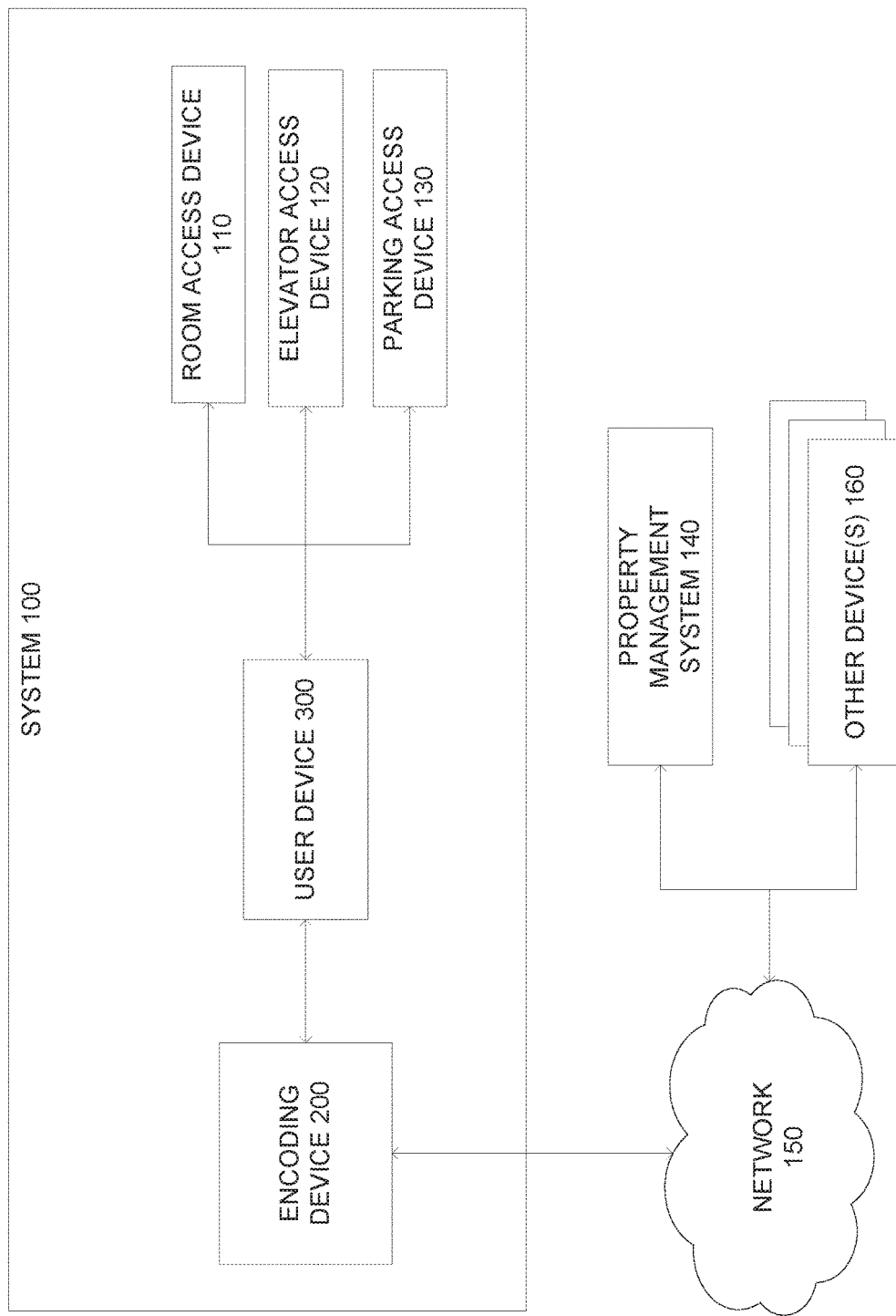
FIG. 1 illustrates a block diagram of an exemplary framework for providing access to services at a place of hospitality according to certain aspects of the disclosure.

Referring now to FIG. 1, an example framework for providing access to services according to certain aspects of the disclosure is described. A system 100 for providing access to various services at a place of hospitality a hotel, a resort, a park, a cruise boat, a restaurant) may include an encoding device 200, a user device 300, and one or more access devices 110, 120, 130, such as, for example, a room access device 110, an elevator access device 120, and a parking access device 130. The user device 300 may be an access key such as a RFID card. The encoding device 200 may be a "hotspot" device that is capable of reading and writing information on the user device 300. In particular, the encoding device 200 may be a RFID writer/reader.

Access devices 110, 120, 130 may be locking devices that secure a door or other access point to a controlled location or service such as a room, an elevator, or a parking lot. For example, room access device 110 may secure a door to a room; elevator access device 120 may secure a door or a panel of an elevator; and parking access device 130 may secure a garage door or gate to a parking lot. Access devices 110, 120, 130 may be electronic card readers that are equipped to read data stored on the user device 300. For example, room access device 110 may be an electronic lock that is capable of reading data stored on the user device 300 pertaining to the vendor of the electronic lock.

The encoding device 200 may be connected to the network 150 via a wired or wireless connection. The network 150 may be a local area network, a wide area network, an intranet, an extranet, the Internet, or any other type of network known in the art. The network 150 may be configured to allow data to be exchanged between the system 100 and other device or devices 160 attached to the network 150. In various aspects, the network 150 may support communication via any suitable wired or wireless general data networks, such as types of Ethernet networks. Additionally, the network 150 may support communication via telecommunications/telephony networks, such as analog voice networks or digital fiber communications networks, via storage area networks, such as Fibre Channel storage area networks (SANs), or via any other suitable type of network and/or protocol, The device(s) 160 attached to network 150 may include a server, a desktop or laptop personal computer, a tablet, a mobile device, or any other type of computer system or device.

The encoding device 200 may also be connected to an access control system or server that interfaces with a property management system 140 though the network 150. The property management system 140 may be a collection of different devices and servers running various software components. The property management system 140 may store information regarding reservations made by guests at a place of hospitality. Such information may be stored in one or more databases. Such information may initially be synchronized and distributed by a central reservation system. The reservations may indicate a number of services that each guest is registered to use. For example, the reservations may indicate that a particular guest has a room reserved at the place of hospitality. The reservations may also indicate that the particular guest has reserved services at a spa located at the place of hospitality.

Figure 2:
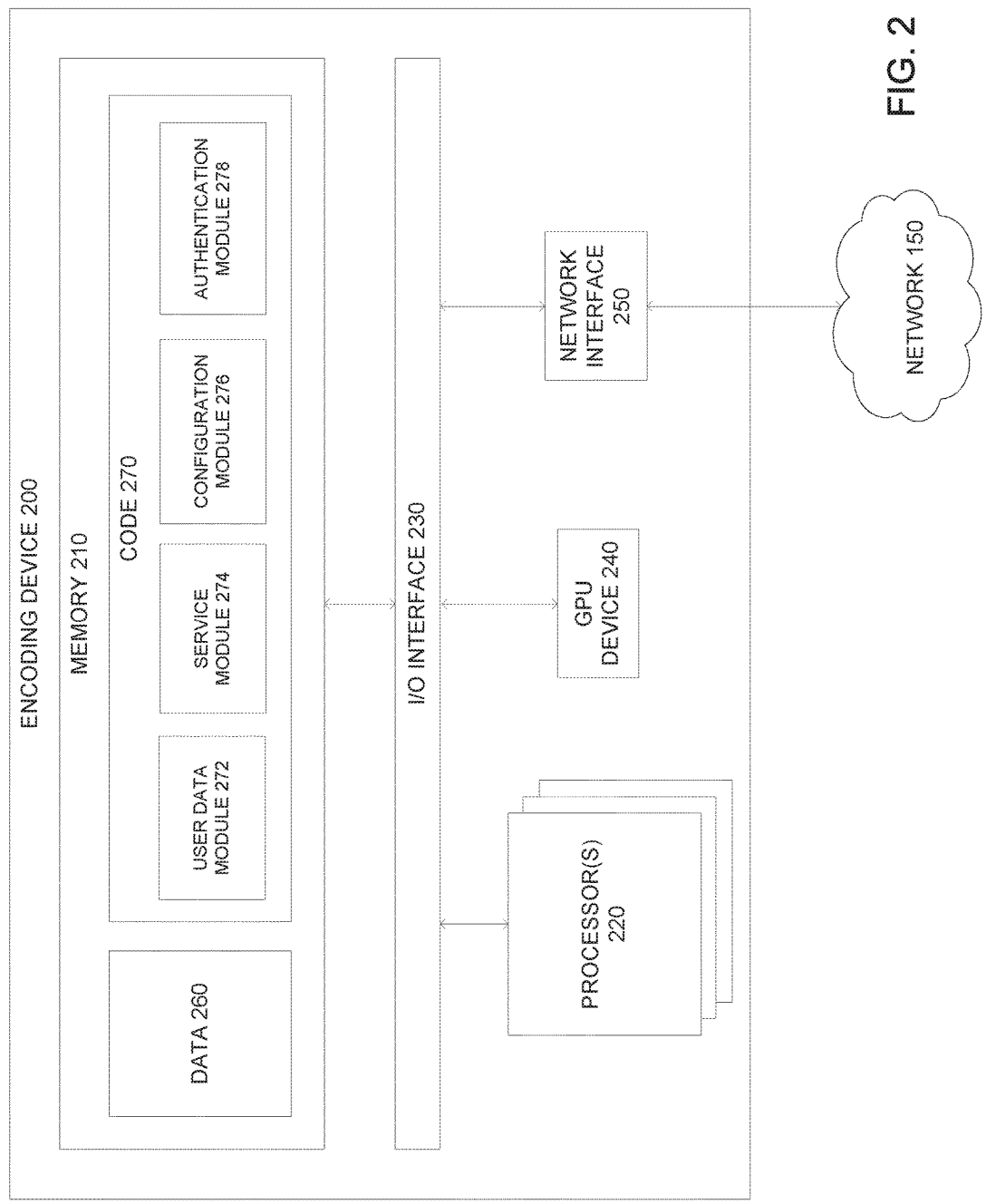
FIG. 2 illustrates an exemplary encoding device for providing access to services at a place of hospitality according to certain aspects of the disclosure.

Referring now to FIG. 2, the encoding device 200 is described. The encoding device 200 may include a memory 210 and one or more processor(s) 220. The memory 210 may include any type of computer-readable medium, such as a memory device, a magnetic or optical medium, firmware, or any other storage medium. The memory 210 stores computer-readable instructions that instruct encoding device 200 to perform certain processes. In particular, the memory 210 stores code 270 including a plurality of modules: a user data module 272, a service module 274, a configuration module 276, and an authentication module 278. The modules may include logic embodied as hardware, firmware, or a collection of software written in a known programming language.

Each of the modules may be executed by at least one of the processor(s) 220. The memory 210 may also store data 260. The data 260 may include manufacture data, configuration data, and other data relating to the encoding device 200. The data 260 may also include data relating to a place of hospitality, such as information regarding services provided at the place of hospitality or information regarding guest reservations.

The processor(s) 220 may be any suitable processors capable of executing instructions. For example, in various aspects, the processor(s) 220 may be general-purpose or embedded processors implementing any of a variety of instruction set architectures (ISAs), such as the x86, PowerPC, SPARC, or MIPS ISAs, or any other suitable ISA. In certain aspects, each of the processor(s) 220 may commonly, but not necessarily, implement the same ISA.

The encoding device 200 may also include a graphics processing unit (GPU) 240. GPU 240 may participate in providing graphics rendering and/or physics processing capabilities. GPU 240 may, for example, include a highly parallelized processor architecture specialized for graphical computations. In some aspects, the processor(s) 220 and the GPU 240 may be implemented as one or more of the same type of device.

In addition, the encoding device 200 may include an input/output (I/O) interface 230. The I/O interface 230 may be configured to coordinate I/O traffic between the processor(s) 220, the memory 210 and any peripherals in the device, including a network interface 250 or other peripheral interfaces. In some aspects, the interface 230 may perform any necessary protocol, timing or other data transformations to convert data signals from one component into a format suitable for use by another component. In some aspects, the I/O interface 230 may include support for devices attached through various types of peripheral buses, such as a variant of the Peripheral Component Interconnect (PCI) bus standard or the Universal Serial Bus (USB) standard. In some aspects some or all of the functionality of the interface 230, such as an interface to the memory 210, may be incorporated directly into the processor(s) 220.

The network interface 250 may be configured to allow data to be exchanged between the encoding device 200 and other device or devices 160 attached to the network 150. In various aspects, the network interface 250 may support communication via any suitable wired or wireless general data networks. Additionally, the network interface 250 may support communication via telecommunications/telephony networks, such as analog voice networks or digital fiber communications networks, via storage area networks or any other suitable type of network and/or protocol.

Referring now to FIG. 3, the user device 300 may be configured to provide access to one or more services at a place of hospitality. The user device 300 may include a plurality of sectors, such as sectors 1 through 31 shown in FIG. 3. Each sector of the user device 300 may include four memory blocks, which may each store four bytes of data. In sector 0, block 0, the first four bytes may store manufacturer data 310 of the manufacturer of the user device 300. Sector 0, block 0 may also store a serial number for the user device 300.

In sector 0, blocks 2 through 3, an application directory 320 may be stored. The application directory 320 may include information regarding the plurality of sectors of the user device 300. Specifically, the application directory 320 may specify details concerning each of the plurality of sectors. For example, the application directory 320 may specify that sectors 1 through 5 are dedicated to a first lock vendor and are to be used for storing information relating to the first lock vendor. As another example, the application directory 320 may specify that sector 11 is shared by two vendors and is to be used for storing shared information of the two vendors. Depending on the storage size of the user device 300, the application directory 320 may include information regarding a first plurality of sectors, such as sectors 1 through 15, and an additional application directory 330 that includes information regarding a second plurality of sectors, such as sectors 17 through 31.

Block 3 of each sector may store configuration data 340, including, for example, permissions and access codes for reading/writing data to that sector. Thus, for example, block 3 of sectors 1 through 5 may store a security code or key for granting access to an external source to read and write data to those sectors. Data can only be read or modified in a sector if the security code for that sector is known. The configuration data 340 may also include management data, which sets forth the requirements for how data is stored in each sector.

In certain aspects, the user device 300 may be used across multiple vendors. Thus, the plurality of sectors may be formatted to store data for a first vendor (e.g., lock vendor data 350) and data for a second vendor (e.g., lock vendor data 352). Specifically, the user device 300 may be configured to store a first data structure for a first vendor and a second data structure for a second vendor. The first data structure may include lock vendor data 350, and the second data structure may include lock vendor data 352. The user device 300 is configured to store at least the following: first lock vendor data 350, second lock vendor data 352, shared vendor data 354, parking vendor data 356, elevator vendor data 358, hotel data 360, and additional vendor(s) data 370.

Hotel data 360 may include information regarding a place of hospitality, such as a name of the place of hospitality, an address of the place of hospitality, one or more services provided at the place of hospitality, etc. Hotel data 360 may also include user data 362 and authentication data 364. User data 362 may include data regarding a user such as a guest staying at the place of hospitality. In particular, user data 362 may include personally identifiable information about a user, such as a legal name, home address, email address, national identification number, passport number, date of birth, telephone number, and/or online alias. User data 362 may be used to determine an identity of the user. Authentication data 364 may include information that can be used to authenticate an external device prior to providing the external device with access to the user data 362. In certain aspects, authentication data 364 may include an authentication challenge and an expected answer or response to the authentication challenge. When an external device, such as the encoding device 200, seeks access to user data 362, the user device 300 may transmit the authentication challenge to the external device. Upon receiving an answer provided in response to the authentication challenge, the user device 300 may compare that answer to the expected answer in authenticate the external device. Alternatively, the external device, such as the encoding device 200, may compare an answer from the user device 300 to authenticate the user device 300.

Vendor data such as lock vendor data 350, lock vendor data 352, shared vendor data 354, parking vendor data 356, elevator vendor data 358, and additional vendor(s) data 370 may include information for accessing locations or services provided by a plurality of vendors. For example, lock vendor data 350 may include a first code for gaining access to a room at the place of hospitality. The first code may unlock an access device, such as the room access device 110, for a room. As another example, elevator vendor data 358 may include a second code for using an elevator. The second code may unlock an access device, such as the elevator access device 120, to enable use of an elevator. As yet another example, parking vendor data 356 may include a third code for using a parking garage. The third code may unlock an access device, such as the parking access device 130, for the parking garage. Each of the access devices may be configured to read the data from the user device 300.

Shared vendor data 354 may be data that is shared among a group of vendors. For example, shared vendor data 354 may include a code that can be used to access services provided by two or more vendors, such as a lock vendor, an elevator vendor, and a parking vendor.

Figure 4A:
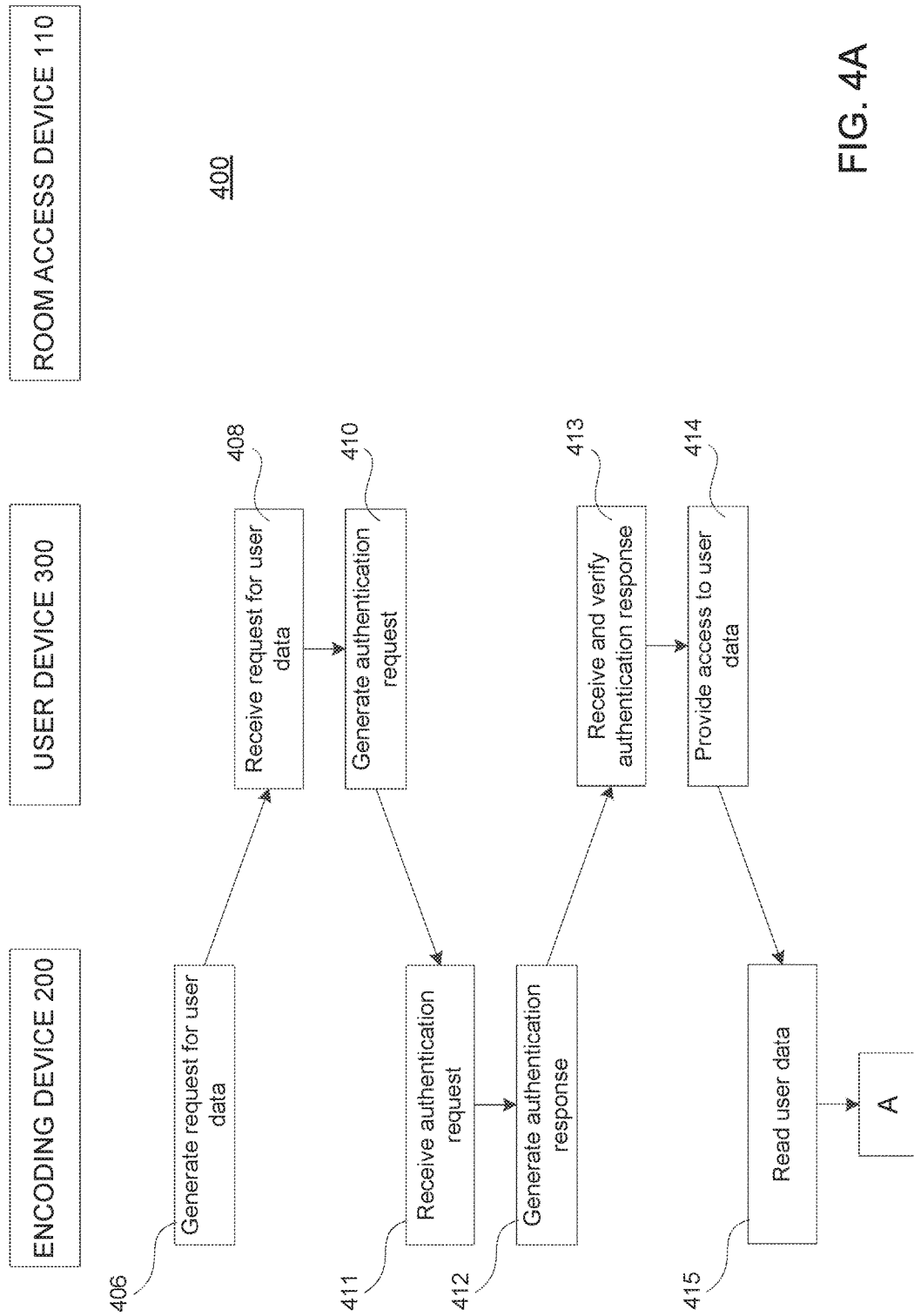
FIGS. 4A-4C illustrate a flowchart showing an exemplary process for providing access to services at a place of hospitality according to certain aspects of the disclosure.
Figure 4B:
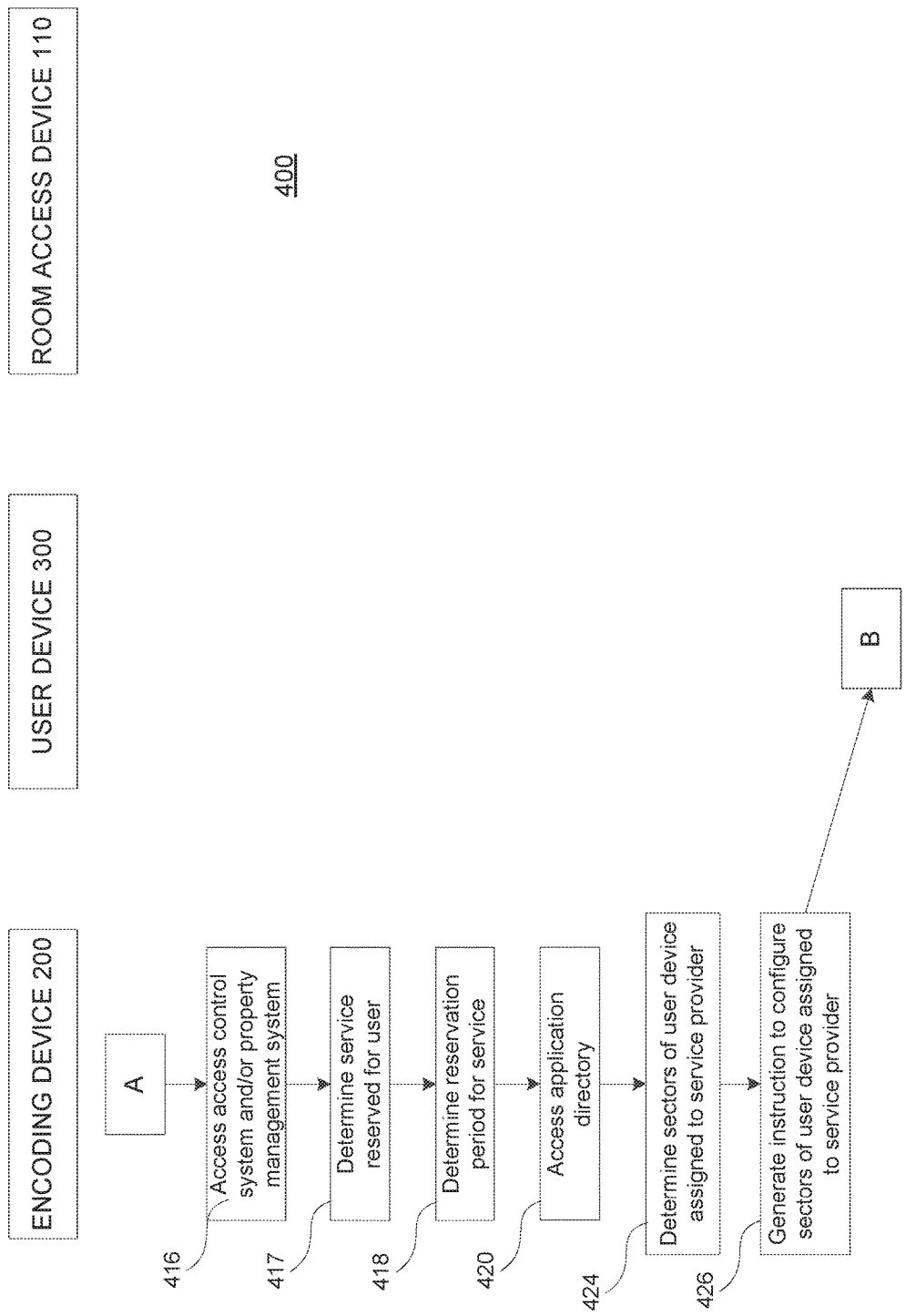
Figure 4C:
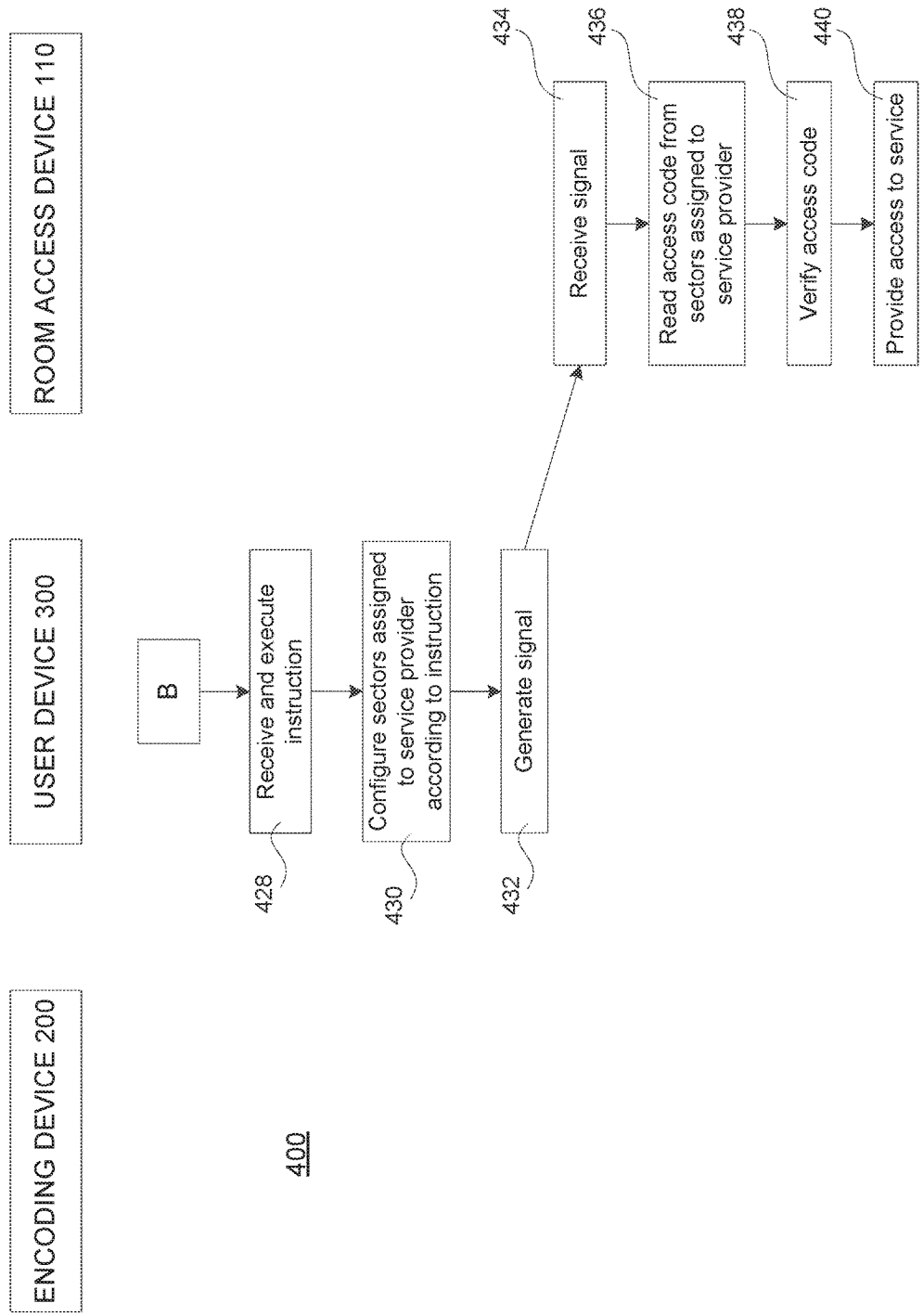

Referring now to FIGS. 4A through 4C, a method for providing access to services at a place of hospitality is described. For illustration purposes, the method depicted in FIGS. 4A through 4C is described in reference to one or more elements of FIGS. 1 through 3.

In method 400, a guest with a reservation at a place of hospitality may arrive at the place of hospitality. For example, the guest may walk into a lobby of a hotel. The guest may have user device 300, which is encoded with personally identifiable information regarding the guest, such as the user data 362. The guest may place user device 300 within a read range of encoding device 200. For example, the guest may tap user device 300 on a receiver of encoding device 200.

At step 406, the encoding device 200, via one or more processors 220 executing user data module 272, may generate a request to access user data that is stored on the user device 300. At step 408, the user device 300 may receive the request for user data. At step 410, the user device 300 may generate an authentication challenge. The authentication challenge may be static or dynamic and may consist of one or multiple challenge questions. The authentication challenge may be based on a shared secret, such as a password or key between the user device 300 and the encoding device 200. Alternatively, the authentication challenge may be a problem that requires a high-cost computation. A device that is authorized to read the user data may have been programmed with the answer to the problem and be able to provide the answer within a short period of time, whereas a device that is not authorized to view the user data would need to expend time and resources to compute the answer to the problem. The user device 300 may be programmed to reject any answer that is not received within a predefined period of time from sending the authentication challenge.

The authentication challenge may be transmitted by the user device 300 to the encoding device 200. At step 411, the encoding device 200 may receive the authentication challenge and, at step 412, the encoding device 200, via one or more processors 220 executing configuration module 276, may generate or retrieve a response to the authentication challenge. The response may be transmitted to the user device 300.

At step 413, the user device 300 may receive the response and verify it. The user device 300 may verify the response by, for example, comparing the response to an expected answer to the authentication challenge. At step 414, in response to the verification of the authentication response, the user device 300 may grant the encoding device 200 access to the user data 362. In some aspects illustrated in FIG. 4A, the verification of the authentication is performed by the user device 300. However, in other aspects, the encoding device 200 may generate the authentication request, the user device 300 may provide a response, and the encoding device 200 may verify the response.

In some aspects, there may not be authentication of the encoding device 200 and/or user device 300. In such aspects, steps 410, 411, 412 and 413 may not be performed. Instead, the method 400 may proceed directly from step 408 to step 414, and the user device 300 may provide access to the user data 362 without authenticating the encoding device 200. Such data may be limited to data that does not readily reveal a guest's identity but nonetheless enables the encoding device 200 to determine an identity of the guest. For example, such data may include an alias that may assist the encoding device 200 in identifying the guest but does not disclose any personal information of the guest.

At step 415, the encoding device 200 may read the user data 362 and determine an identity of the guest. At step 416, the encoding device 200 may access an access control system or property management system (via an interface with the access control system) for the place of hospitality. For example, the encoding device 200 may access the property management system 140 via the network 150. The property management system 140 may be a computerized system that stores and distributes information regarding reservations for one or more places of hospitality. In particular, the property management system 140 may store information regarding reservations made by guests at the place of hospitality.

At step 417, the encoding device 200, via one or more processors 220 executing the service module 274, may determine a service reserved for the guest at the place of hospitality. The service may include, for example, room lodging, use of a fitness center, elevator services, parking services, etc. The encoding device 200 may determine a service reserved for the guest based on information provided by the property management system 140. For example, the encoding device 200 may look up the guest in the property management system 140 and find a reservation associated with the guest. The encoding device 200 may then determine one or more services that are reserved for the guest based on the reservation.

At step 418, the encoding device 200, via one or more processors 220 executing service module 274, may determine a period that the service is reserved for the guest. For example, if the guest has a room reservation, the encoding device 200 may determine a period of time that the room is reserved for the guest.

In steps 420, 424, 426, 428, 430, the encoding device 200, via one or more processors 220 executing the configuration module 276, may configure a portion of one or more sectors of the plurality of sectors of the user device 300 to provide access to the service reserved for the guest. Access to the service may be provided by a service provider. Configuring the portion of the one or more sectors to provide access to the service reserved for the guest may involve, in some aspects, writing new data to the one or more sectors.

At step 420, the encoding device 200 may access the application directory 320 of the user device 300. The application directory 320 may include information regarding the plurality of sectors of the user device 300. At step 424, the encoding device 200 may determine one or more sectors of the plurality of sectors that are assigned to the service provider providing access to the service. As an example, the encoding device 200 may determine that sectors 1 through 5 are assigned to the service provider providing access to the service. The encoding device 200 may determine the sectors that are assigned to the service provider based on, for example, the information stored in the application directory 320. The one or more sectors assigned to the service provider may be formatted to store information, such as lock vendor data 352 relating to the service reserved for the guest and provided by the service provider.

At step 426, the encoding device 200 may generate an instruction for configuring the one or more sectors assigned to the service provider to provide access to the service reserved for the guest. The instruction will enable the guest with access to the service for at least the period that the service is reserved for the guest. In some aspects, the instruction may enable the guest with access to the service only during the period it is reserved for the guest. Accordingly, in such aspects, the instruction may deny the guest access to the service outside of his reservation period.

The generated instruction may be transmitted to the user device 300 and, at step 428, the user device 300 may receive the instruction and execute it. Upon executing the instruction, the user device 300 may configure at least a portion of the one or more sectors assigned to the service provider to provide access to the service. In certain aspects, configuring the portion of the one or more sectors may include storing a code for accessing the service in the one or more sectors. In other aspects, the code for accessing the service may be pre-stored in the one or more sectors. Access to the code, however, may be blocked. Thus, configuring the portion of the one or more sectors may include changing an access condition for reading the code stored in the one or more sectors. Specifically, configuring the portion of the one or more sectors may include modifying configuration data 340 stored in block 3 of the one or more sectors assigned to the service provider to enable access to data stored in specified sectors.

At step 432, the user device 300 may generate a signal proximate to an access device securing the service. As an example, the guest holding the user device 300 may be outside of the door to his reserved room. Entry to the reserved room may be controlled by room access device 110. At step 434, the access device may receive the signal. At step 436, the access device may read the code for accessing the service from the one or more sectors assigned to the service provider. At step 438, the access device may verify the code by, for example, determining whether the code matches an expected code. The expected code may have been previously programmed into the memory of the access device. At step 440, the access device may provide access to the service, for example, by unlocking a door to the room.

It should also be appreciated that the elements and systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, database servers, network storage devices and other network devices, tablets, cellphones, wireless phones, pagers, electronic organizers, Internet appliances, and various other consumer products that include appropriate communication capabilities. In addition, the functionality provided by the illustrated elements may in some aspects be combined in fewer elements or distributed in additional elements. Similarly, in some aspects, the functionality of some of the illustrated elements may not be provided and/or other additional functionality may be available.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

It will be appreciated that the present disclosure may include any one and up to all of the following examples.

EXAMPLE 1

A method for providing access to one or more services at a place of hospitality, the method comprising: receiving information regarding a user from a medium, the medium comprising a plurality of sectors, and the information regarding the user being stored on one or more dedicated sectors; determining, based on the information regarding the user, an identity of the user; identifying, based on the identity of the user, a service reserved for the user, the service provided by a service provider at the place of hospitality; identifying one or more dedicated sectors of the plurality of sectors of the medium assigned to the service provider; and configuring the one or more dedicated sectors assigned to the service provider to enable access to the service reserved for the user and provided by the service provider.

EXAMPLE 2

The method of Example 1, wherein configuring the one or more dedicated sectors assigned to the service provider to enable access to the service reserved for the user comprises: determining a code for enabling access to the service reserved for the user; and transmitting, to the medium, instructions to store the code in the one or more dedicated sectors assigned to the service provider.

EXAMPLE 3

The method of Example 1, further comprising: receiving an authentication challenge from the medium; generating an authentication response to the authentication challenge; and transmitting the authentication response to the medium, the medium being configured to verify the authentication response, wherein receiving the information regarding the user from the medium comprises receiving, in response to the authentication response being verified by the medium, the information regarding the user from the medium.

EXAMPLE 4

The method of Example 1, further comprising determining a reservation period for the service reserved for the user and provided by the service provider, wherein the one or more dedicated sectors configured to enable access to the service reserved for the user are configured to enable access to the service reserved for the user during the reservation period.

EXAMPLE 5

The method of Example 4, wherein the one or more dedicated sectors configured to enable access to the service reserved for the user are configured to deny access to the service reserved for the user outside of the reservation period.

EXAMPLE 6

The method of Example 1, wherein the medium is a radio-frequency identification card.

EXAMPLE 7

The method of Example 1, wherein the service reserved for the user comprises a secured room of a lodging establishment, wherein configuring the one or more dedicated sectors assigned to the service provider to enable access to the service reserved for the user comprises configuring the one or more dedicated sectors assigned to the service provider to unlock a door to the secured room.

EXAMPLE 8

The method of Example 1, wherein the plurality of sectors of the medium comprise multiple sets of one or more sectors each assigned to a different service provider.

EXAMPLE 9

The method of Example 1, wherein the service provider is selected from a group consisting of a lock vendor, a parking vendor, and an elevator vendor.

EXAMPLE 10

The method of Example 1, wherein identifying the service reserved for the user based on the identity of the user comprises: accessing reservation information for the place of hospitality; determining a reservation associated with the user; and determining the service reserved for the user based on at least the reservation associated with the user.

EXAMPLE 11

The method of Example 10, wherein accessing the reservation information for the place of hospitality comprises communicating with a remote server storing the reservation information for the place of hospitality.

EXAMPLE 12

The method of Example 1, wherein identifying the one or more dedicated sectors assigned to the service provider comprises accessing an application directory stored on the medium, the application directory comprising information regarding the plurality of sectors.

EXAMPLE 13

A device for providing access to one or more services at a place of hospitality, the device comprising: a processor; a storage medium comprising a plurality of sectors; a receiver configured to receive a first instruction; and a transmitter configured to transmit a signal to an access device. The plurality of sectors comprising: a first dedicated set of sectors configured to store information regarding a user; a second dedicated set of sectors configured to store information associated with a first service provider; and a third dedicated set of sectors configured to store information associated with a second service provider that is different from the first service provider. The first instruction received by the receiver configured to, upon execution by the processor, cause the device to configure the second dedicated set of sectors to enable access to a service provided by the first service provider at the place of hospitality, where the access device is associated with the service provided by the first service provider at the place of hospitality.

EXAMPLE 14

The device of Example 13, wherein the device is caused to configure the second dedicated set of sectors to enable access to the service provided by the first service provider by storing a code for enabling access to the service provided by the first service provider in the second dedicated set of sectors.

EXAMPLE 15

The device of Example 13, wherein the receiver is configured to receive a second instruction that, upon execution by the processor, causes the device to: transmit, to another device requesting access to the information regarding the user stored in the first dedicated set of sectors, an authentication challenge; receive, from the other device, an authentication response to the authentication challenge; verify the authentication response received from the other device; and enable, in response to the verification of the authentication response, access to the information regarding the user to the other device.

EXAMPLE 16

The device of Example 13, wherein the device is a radio-frequency identification card.

EXAMPLE 17

The device of Example 13, wherein the storage medium comprises rewritable memory.

EXAMPLE 18

The device of Example 13, wherein the storage medium stores an application directory comprising information regarding the plurality of sectors.

EXAMPLE 19

A system for providing access to one or more services at a place of hospitality, the system comprising a user device comprising a processor and a storage medium comprising a plurality of sectors. The plurality of sectors comprising: a first dedicated set of sectors configured to store information regarding a user; a second dedicated set of sectors configured to store information associated with a first service provider; and a third dedicated set of sectors configured to store information associated with a second service provider that is different from the first service provider. The system further comprising an encoding device configured to: receive the information regarding the user stored in first dedicated set of sectors; determine, based on the information regarding the user, an identity of the user; identify, based on the identity of the user, a service reserved for the user, the service provided by the first service provider; identify the second dedicated set of sectors assigned to the first service provider; and configure the second dedicated set of sectors assigned to the first service provider to enable access to the service reserved for the user and provided by the first service provider. The system further comprising an access device associated with the service at the place of hospitality, the access device configured to: access a code stored in the second dedicated set of sectors assigned to the first service provider, the code enabling the service reserved for the user and provided by the first service provider; determine whether the code matches an expected code; and enable access to the service reserved for the user in response to the determination that the code matches the expected code.

EXAMPLE 20

The system of Example 19, wherein the encoding device is configured to configure the second dedicated set of sectors assigned to the first service provider to enable access to the service reserved for the user by: determining the code for enabling the service reserved for the user and provided by the first service provider; and transmitting, to the user device, instructions to be stored in the second dedicated set of sectors assigned to the first service provider.

EXAMPLE 21

The system of Example 19, wherein the user device is further configured to authenticate the encoding device prior to providing access to the information regarding the user to the encoding device, the authentication comprising: transmitting, to the encoding device, an authentication challenge; receiving, from the encoding device, an authentication response to the authentication challenge; verifying the authentication response received from the encoding device; and enabling, in response to the verification of the authentication response, access to the information regarding the user to the encoding device.

EXAMPLE 22

The system of Example 19, wherein the user device is a radio-frequency identification card.

EXAMPLE 23

The system of Example 19, wherein the access device is an electronic RFID radio-frequency identification card lock system.

EXAMPLE 24

The system of Example 19, wherein the service comprises a secured room of a lodging establishment, and wherein the access device is configured to enable access to the service by unlocking a door to the secured room.

EXAMPLE 25

The system of Example 19, wherein the user device further comprises an application directory, the application directory comprising information regarding the plurality of sectors, and wherein the access device is configured to access the code stored in the second dedicated set of sectors by: accessing the application directory; determining that the second dedicated set of sectors stores the code based on at least the information contained in the application directory; and accessing the code from the second dedicated set of sectors.

EXAMPLE 26

The system of Example 19, wherein at least one of the first service provider and the second service provider is selected from a group consisting of a lock vendor, a parking vendor, and an elevator vendor.

EXAMPLE 27

The system of Example 19, wherein the encoding device is configured to identify the service reserved for the user by: accessing reservation information for the place of hospitality; determining a reservation associated with the user; and identifying the service reserved for the user based on at least the reservation associated with the user.

EXAMPLE 28

The system of Example 27, wherein accessing the reservation information comprises communicating with a remote server storing the reservation information.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed example aspects. The exemplary systems and components described herein may be configured differently than described. For example, elements may be added to, removed from, or rearranged compared to the disclosed example aspects.

We claim:

1. A method for providing access to one or more services at a place of hospitality, the method comprising:
   receiving information regarding a user from a medium, the medium comprising a plurality of sectors, and the information regarding the user being stored on one or more dedicated sectors of the plurality of sectors;
   determining, based on the information regarding the user, an identity of the user;
   identifying, based on the identity of the user, a service reserved for the user, the service provided by a service provider at the place of hospitality;
   identifying at least one of the one or more dedicated sectors assigned to the service provider;
   storing, using an encoding device at the place of hospitality and to the at least one of the one or more dedicated sectors assigned to the service provider, data comprising a code associated with the service provider; and
   encoding the one or more dedicated sectors to send an indication of the data to an access device configured to enable access to the service reserved for the user and provided by the service provider.

2. The method of claim 1, wherein storing the data comprises:
determining the code associated with the service provider
storing, by the encoding device, the determined code in the at least one of the one or more dedicated sectors assigned to the service provider.

3. The method of claim 1, further comprising:
receiving an authentication challenge from the medium;
generating an authentication response to the authentication challenge; and
transmitting the authentication response to the medium, the medium being configured to verify the authentication response,
wherein receiving the information regarding the user from the medium comprises receiving, in response to the authentication response being verified by the medium, the information regarding the user from the medium.

4. The method of claim 1, further comprising determining a reservation period for the service reserved for the user and provided by the service provider,
wherein the at least one of the one or more dedicated sectors encoded to send the indication of the data to the access device are encoded to enable access to the service reserved for the user during the reservation period.

5. The method of claim 4, wherein the at least one of the one or more dedicated sectors encoded to enable access to the service reserved for the user are encoded to deny access to the service reserved for the user outside of the reservation period.

6. The method of claim 1, wherein the medium comprises a radio-frequency identification card.

7. The method of claim 1, wherein the service reserved for the user comprises a secured room of a lodging establishment,
wherein encoding the at least one of the one or more dedicated sectors assigned to the service provider comprises encoding the at least one of the one or more dedicated sectors assigned to the service provider to unlock a door to the secured room.

8. The method of claim 1, wherein the plurality of sectors of the medium comprise multiple sets of one or more sectors each assigned to a different service provider.

9. The method of claim 1, wherein the service provider is selected from a group consisting of a lock vendor, a parking vendor, and an elevator vendor.

10. The method of claim 1, wherein identifying the service reserved for the user based on the identity of the user comprises:
accessing reservation information for the place of hospitality;
determining a reservation associated with the user; and
determining the service reserved for the user based on at least the reservation associated with the user.

11. The method of claim 10, wherein accessing the reservation information for the place of hospitality comprises communicating with a remote server storing the reservation information for the place of hospitality.

12. The method of claim 1, wherein identifying the at least one of the one or more dedicated sectors assigned to the service provider comprises accessing an application directory stored on the medium, the application directory comprising information regarding the plurality of sectors.

13. A device for providing access to one or more services at a place of hospitality, the device comprising:
a processor;
a storage medium comprising a plurality of sectors comprising:
a first dedicated set of sectors configured to store information regarding a user;
a second dedicated set of sectors configured to store information associated with a first service provider; and
a third dedicated set of sectors configured to store information associated with a second service provider that is different from the first service provider;
a receiver configured to receive, from an encoding device at the place of hospitality, a first instruction, wherein the first instruction, upon execution by the processor, causes the device to store data comprising a code associated with the first service provider to the second dedicated set of sectors and encode the second dedicated set of sectors to send an indication of the data to an access device configured to enable access to a service provided by the first service provider at the place of hospitality; and
a transmitter configured to transmit the indication of the data to the access device.

14. The device of claim 13, wherein the access device is configured to enable access to the service provided by the first service provider based on determining that the code matches a code stored to the access device.

15. The device of claim 13, wherein the receiver is configured to receive a second instruction that, upon execution by the processor, causes the device to:
transmit, to an external device requesting access to the information regarding the user stored in the first dedicated set of sectors, an authentication challenge;
receive, from the external device, an authentication response to the authentication challenge;
verify the authentication response received from the external device; and
enable, in response to the verification of the authentication response, access to the information regarding the user to the external device.

16. The device of claim 13, wherein the device comprises a radio-frequency identification card.

17. The device of claim 13, wherein the storage medium comprises rewritable memory.

18. The device of claim 13, wherein the storage medium stores an application directory comprising information regarding the plurality of sectors.

19. A system for providing access to one or more services at a place of hospitality, the system comprising:
a user device comprising a processor and a storage medium comprising a plurality of sectors comprising:
a first dedicated set of sectors configured to store information regarding a user;
a second dedicated set of sectors configured to store information associated with a first service provider; and
a third dedicated set of sectors configured to store information associated with a second service provider that is different from the first service provider;
an encoding device at the place of hospitality configured to:
receive the information regarding the user stored in first dedicated set of sectors;
determine, based on the information regarding the user, an identity of the user;
identify, based on the identity of the user, a service reserved for the user, the service provided by the first service provider;

identify the second dedicated set of sectors assigned to the first service provider;

store, in the second dedicated set of sectors assigned to the first service provider, data comprising a code associated with the first service provider; and encode the second dedicated set of sectors assigned to the first service provider to send an indication of the data to an access device configured to enable access to the service reserved for the user and provided by the first service provider; and an access device associated with the service at the place of hospitality, the access device configured to:

access the code stored in the second dedicated set of sectors assigned to the first service provider, the code enabling the service reserved for the user and provided by the first service provider;

determine whether the code matches an expected code; and enable access to the service reserved for the user in response to the determination that the code matches the expected code.

20. The system of claim 19, wherein the encoding device is configured to encode the second dedicated set of sectors assigned to the first service provider to send the indication of the data by:

determining the code associated with the first service provider; and storing instructions in the second dedicated set of sectors assigned to the first service provider.

* * * * *